United States Patent
Menezes

(10) Patent No.: US 7,503,652 B2
(45) Date of Patent: Mar. 17, 2009

(54) TRANSLATING MULTIFOCAL OPHTHALMIC LENSES

(75) Inventor: Edgar V. Menezes, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 70 days.

(21) Appl. No.: 11/427,525

(22) Filed: Jun. 29, 2006

(65) Prior Publication Data

US 2008/0002148 A1  Jan. 3, 2008

(51) Int. Cl.
 G02C 7/04 (2006.01)
 G02C 7/06 (2006.01)

(52) U.S. Cl. .................................. 351/161; 351/177

(58) Field of Classification Search ............. 351/160 R, 351/161, 164, 177
See application file for complete search history.

(56) References Cited

U.S. PATENT DOCUMENTS

| | | | |
|---|---|---|---|
| 4,618,227 A | 10/1986 | Bayshore | |
| 4,693,572 A | 9/1987 | Tsuetsaki et al. | |
| 4,923,296 A * | 5/1990 | Erickson | 351/161 |
| 5,141,301 A | 8/1992 | Morstad | |
| 5,245,366 A | 9/1993 | Svochak | |
| 5,483,304 A | 1/1996 | Porat | |
| 5,485,228 A | 1/1996 | Roffman et al. | |
| 5,606,378 A | 2/1997 | Van Meurs | |
| 6,007,201 A | 12/1999 | Wada et al. | |
| 6,092,899 A | 7/2000 | Wanders | |
| 6,746,118 B2 | 6/2004 | Mandell | |
| 6,871,953 B1 | 3/2005 | Mandell et al. | |
| 7,044,597 B2 | 5/2006 | Altmann | |
| 2004/0017542 A1 | 1/2004 | Lindacher et al. | |
| 2005/0099595 A1 | 5/2005 | Lindacher | |

FOREIGN PATENT DOCUMENTS

| | | |
|---|---|---|
| EP | 0601846 | 6/1994 |
| EP | 0949529 | 10/1999 |
| EP | 0996024 | 4/2000 |

* cited by examiner

*Primary Examiner*—Darryl J Collins

(57) ABSTRACT

The invention provides translating, multifocal lenses that are pupil insensitive or independent.

9 Claims, 7 Drawing Sheets

TRANSLATING MULTIFOCAL OPHTHALMIC LENSES

FIELD OF THE INVENTION

The invention relates to ophthalmic lenses. In particular, the invention provides lenses that provide more than one optical power, or focal length, and are useful in the correction of presbyopia.

BACKGROUND OF THE INVENTION

As an individual ages, the eye is less able to accommodate, or bend the natural lens, to focus on objects that are relatively near to the observer. This condition is known as presbyopia. Among the methods used to correct presbyopia is the providing of contact lenses incorporating both near and distance vision correction on each contact lens worn by the individual. In one type of such lenses, the distance and near vision regions are concentrically arranged around the geometric center of the lens. In another type of lens, a segmented lens, the near and distance vision regions are not concentric about the geometric center of the lens. In this type of lens, the majority of the near vision portion is located below the 0-180 degree, or horizontal, axis of the lens.

The wearer of the segmented lenses is able to access the near vision region of the lens because the lens is constructed to allow it to translate, or move vertically relative to the pupil of the wearer's eye. Thus, when the lens wearer's gaze shifts downwardly to read, the lens moves vertically upwardly positioning the near vision portion in the center of the wearer's gaze.

Conventional translating contact lenses are disadvantageous in that the vertical distance that the lens must move is large given that the lenses incorporate only a distance and near vision zone. Also, if the wearer's pupil is constricted, the lens will have even farther to translate to allow the wearer to access the near vision zone. Yet another disadvantage of the conventional lenses is that the difference in magnification between the near and distance vision zones will produce an effect in which the viewed image appears to "jump" as one moves from distance to near vision zones.

DETAILED DESCRIPTION OF THE INVENTION AND PREFERRED EMBODIMENTS

The invention provides methods for correcting presbyopia, contact lenses for such correction, and methods for producing the lenses of the invention. The lenses of the invention are translating, multifocal lenses which are pupil insensitive or independent, meaning that the desired percentage of distance to near optical power is provided regardless of pupil size.

In one embodiment, the invention provides a translating contact lens comprising, consisting essentially of, and consisting of an optic zone having at least two distance vision zones and at least one near vision zone. In another embodiment, the invention provides a translating contact lens comprising, consisting essentially of, and consisting of an optic zone having at least two near vision zones and at least one distance vision zone.

By "distance vision zone" is meant a zone in which the amount of refractive power required to correct the lens wearer's distance vision acuity to the desired degree, or distance optical power, is provided. By "near vision zone" is meant a zone in which the amount of refractive power required to correct the wearer's near vision acuity to the desired degree, or near optical power is provided.

In one embodiment of the lenses of the invention, one surface of the lens, preferably the convex or anterior surface, has a central optic zone with at least two distance vision zones along with at least one near vision zone. The lenses of the invention are designed so that the distance power within the pupil area, or area overlaying the lens wearer's pupil while the lens is on-eye, composes greater than 50% of the corrective power in the pupil area in the superior portion of the optic zone, meaning the portion at or above the 0-180 degree, or horizontal, meridian, and less than 50% below the 0-180 degree meridian. Additionally, the location of the zones is such as to minimize the impact of pupil size in ability to access a zone.

Figure 1:
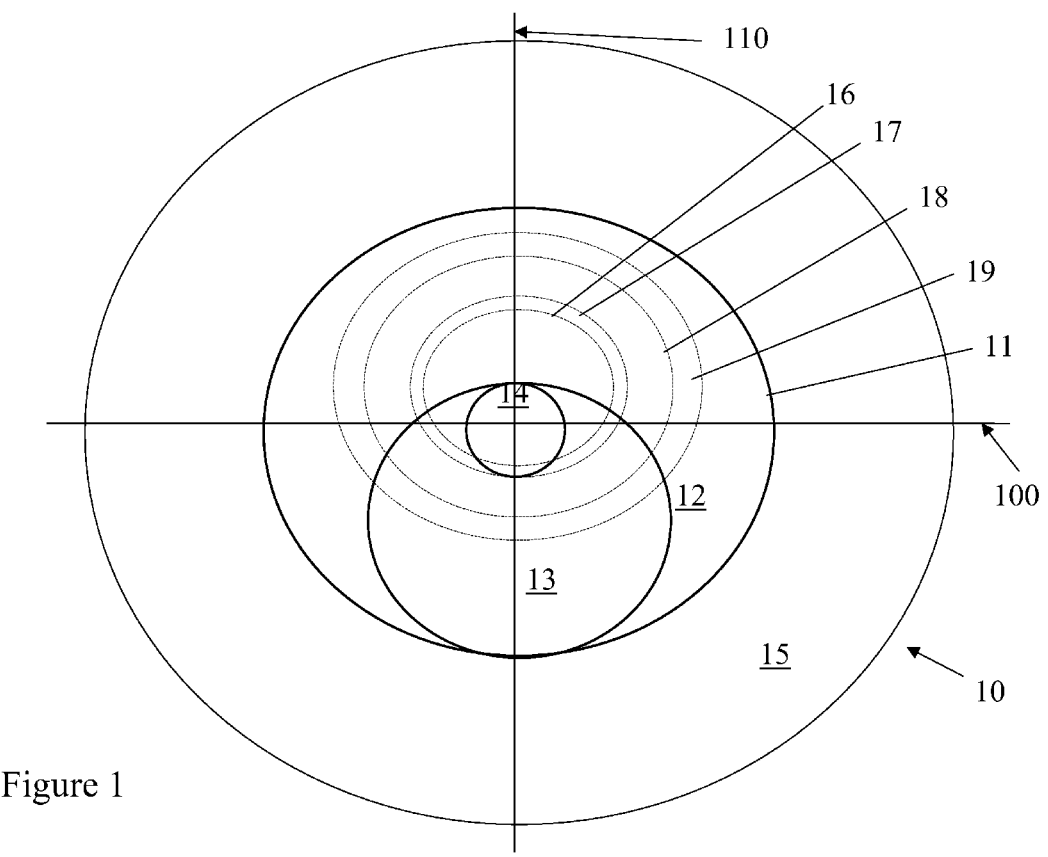
FIG. 1 depicts one embodiment of a lens of the invention.

In FIG. 1 is shown one embodiment of lens of the invention. Lens 10 of FIG. 1 has an anterior surface, as shown, and a posterior surface, that is not shown. Lines 100 and 110 represent the horizontal, or 0-180 degree, and vertical, or 90-270 degree, meridians of the lens, respectively. On the anterior surface of the lens is optic zone 11 surrounded by non-optical lenticular zone 15. The stabilization feature of the lens, also not shown, may be any of the known stabilization types and will be located within lenticular zone 15. Optic zone 11 has an inner distance vision zone 14, an outer distance vision zone 12, and a near vision zone 13. The centers of distance zones 14 and 12 are located at the geometric center of the optic zone 11.

Distance vision zone 14 lies within near vision zone 13 such that the superior-most border of near vision zone 13 is tangential to the superior border of distance zone 14. The center of near vision zone 13 is located substantially along the vertical meridian 110 at about y=−1.63 mm. The inferior-most border of near vision zone 13 is tangential to the inferior-most border of distance vision zone 12. The remainder of distance vision zone 12 surrounds near vision zone 13. For convenience, the boundaries of the various zones in all of the figures are shown as discrete lines. However, one ordinarily skilled in the art will recognize that the boundaries may be blended or aspheric.

Figure 2:
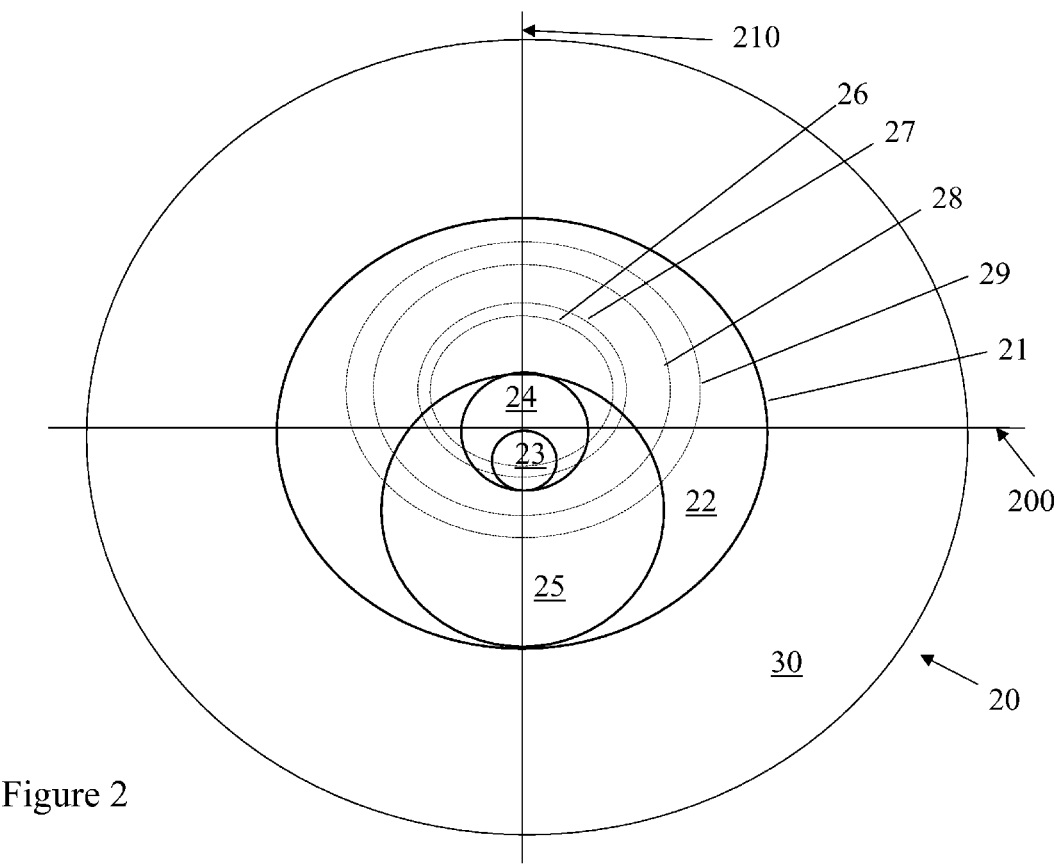
FIG. 2 depicts a second embodiment of the lens of the invention.

A second embodiment of the lens of the invention is shown in FIG. 2. On lens 20 of FIG. 2, lines 200 and 210 represent the horizontal and vertical meridians of the lens, respectively. The optic zone 21 is surrounded by non-optical lenticular zone 30. Optic zone 21 contains outer distance vision zone 22 and inner distance vision zone 24 as well as outer and inner near vision zones 25 and 23, respectively. The centers of distance zones 24 and 22 are located at the geometric center of optic zone 21. Distance vision zone 24 lies within near vision zone 25 and is located such that its superior-most border is tangential to the superior-most border of distance vision zone 24. Near vision zone 25 is centered substantially along the vertical meridian 210 at about y=−1.63 mm. The inferior-most border of near vision zone 25 is coincident with inferior-most border of distance vision zone 22.

Inner near vision zone 23 lies within the inferior-most portion of distance vision zone 24 with its superior-most border at or below the horizontal meridian 200. The inferior border of near vision zone 23 is tangential to the inferior border of distance zone 24. Near vision zone 23 is centered substantially along the vertical meridian 210 at about y=−0.74 mm.

As shown, and preferably, both the near and distance vision zones are on one surface of the lens. However, the zones may be split between the anterior and posterior surfaces of the lens.

Figure 7:
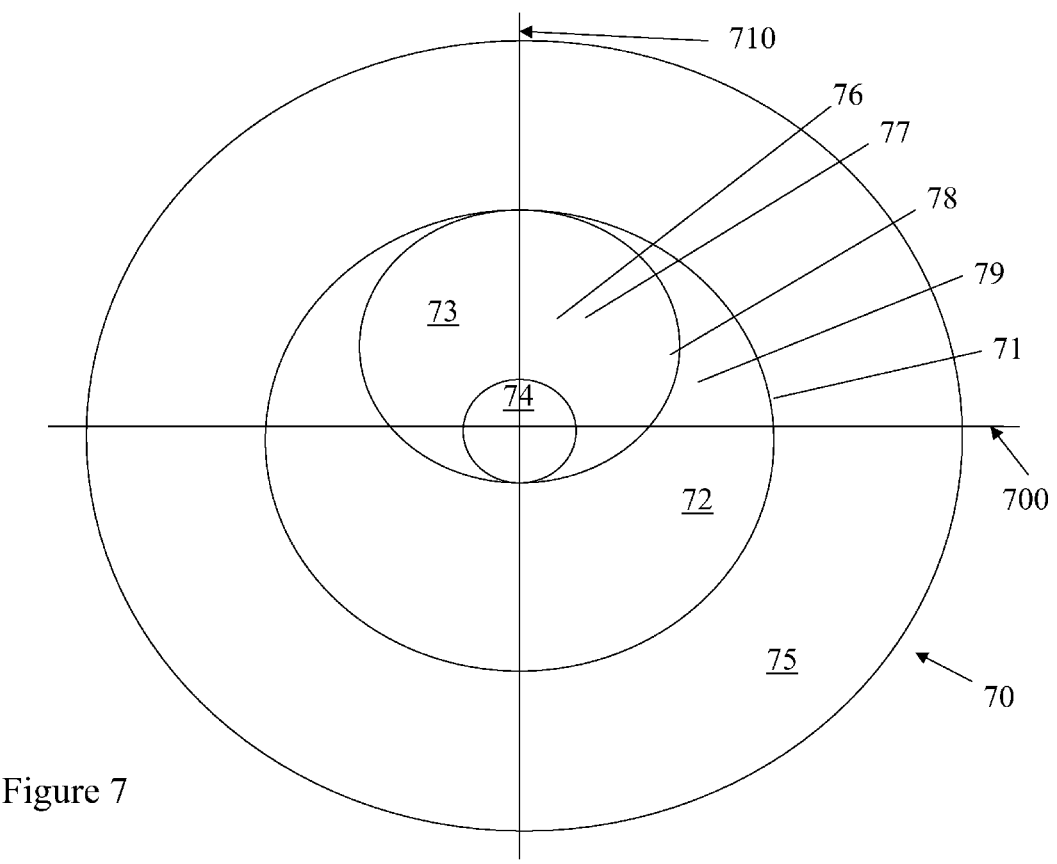
FIG. 7 depicts a third embodiment of the lens of the invention.

Yet another embodiment of the lens of the invention is shown in FIG. 7. On lens 70 of FIG. 7, lines 700 and 710 represent the horizontal and vertical meridians of the lens, respectively. The optic zone 71 is surrounded by non-optical lenticular zone 75. Optic zone 71 contains distance vision zone 73 and inner and outer near zones 74 and 72, respectively. The center of near zones 72 and 74 are located at the geometric center of optic zone 71. Distance vision zone 73 lies within near vision zone 72 and is located such that its superior-most border is tangential to the superior-most border of near vision zone 72. Distance vision zone 73 is centered substantially along the vertical meridian 710 at about y=+3.2 mm. The inferior-most border of near vision zone 74 is coincident with inferior-most border of distance vision zone 73.

In one embodiment, the ratio of the lens' optic zone area devoted to distance and near optical power are equal in both lenses of a lens pair worn by an individual. In another embodiment, the ratio of the lens' optic zone area devoted to the distance and near optical powers must be such that more area is devoted to the distance power for the dominant eye and more lens area will be devoted to the near vision power in the non-dominant eye. The preferred areas, on a percentage basis, for both the dominant and non-dominant eye lenses are disclosed in U.S. Pat. Nos. 5,835,192, 5,485,228, and 5,448,312, incorporated herein in their entireties by reference.

The lenses of the invention preferably incorporate a feature to assure that the lens translates while on-eye. Examples of features for ensuring translation are known in the art and include, without limitation, prism ballast, incorporating one or more ramps, ledges or the like in the inferior portion of the lens, truncation of the lens and the like. These features, as well as additional features useful for achieving translation of a lens on-eye are disclosed in U.S. Pat. Nos. 4,618,227, 5,141,301, 5,245,366, 5,483,304, 5,606,378, 6,092,899, as well as U.S. Patent Application Publication No. 20040017542 incorporated in their entireties herein by reference.

The translation feature typically will also serve to rotationally stabilize the lens on-eye. However, it may be desirable to incorporate a separate stabilization zone in the lens. Suitable stabilization can be accomplished by incorporating one or more of the following into the lens: decentering the lens' front surface relative to the back surface, thickening of the inferior lens periphery, forming depressions or elevations on the lens' surface, using thin zones, or areas in which the thickness of the lens' periphery is reduced and the like and combinations thereof.

The contact lenses of the invention may be either hard or soft lenses, but preferably are soft contact lenses. Soft contact lenses, made of any material suitable for producing such lenses, preferably are used. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens material contains a siloxane functionality, including, without limitation, polydimethyl siloxane macromers, methacryloxypropyl polyalkyl siloxanes, and mixtures thereof, a silicone hydrogel or a hydrogel, made of monomers containing hydroxy groups, carboxyl groups, or combinations thereof. Materials for making soft contact lenses are well known and commercially available. Preferably, the material is acquafilcon, etafilcon, genfilcon, lenefilcon, balafilcon, lotrafilcon, or galyfilcon.

The lenses of the invention may have any of a variety of corrective optical characteristics incorporated onto the surfaces in addition to distance and near optical powers, such as, for example, cylinder power.

The lenses of the invention may be formed by any conventional method. For example, the zones formed therein may produced by diamond-turning using alternating radii. The zones may be diamond-turned into the molds that are used to form the lens of the invention. Subsequently, a suitable liquid resin is placed between the molds followed by compression and curing of the resin to form the lenses of the invention. Alternatively, the zones may be diamond-turned into lens buttons.

The invention may be further clarified by a consideration of the following examples.

EXAMPLES

Example 1

A lens in accordance with FIG. 1 is provided. Referring to FIG. 1, optic zone 11 has an outer distance vision zone 12 with a diameter of 8 mm and an inner distance vision zone 14 with a diameter of 1.60 mm. Near vision zone 13 is 1.60 mm in diameter. Dotted lines 16, 17, 18 and 19 represent pupils of diameters of 3.0, 3.5, 5.0 and 6.0 mm, respectively.

The distance percentage within the pupil area was calculated for each pupil size and at pupil locations of y=0 and y=−1.5 mm from a distance reference point that is located at y=0.8 mm, meaning a point along the 90-270 degree meridian that is 0.8 mm superiorly from the 0-180 degree meridian. The results in Table 1 demonstrate that the lens design produces a pupil independent distance percentage for both y=0 and y=−1.5 mm meaning that, at y=0, the distance percentage is >50 &, at y=−1.5, is <50%, and the percentages are relatively constant with pupil size.

TABLE 1

| Example 1 | 3.0 mm | 3.5 mm | 5.0 mm | 6.0 mm | Average |
|---|---|---|---|---|---|
| 0.0 mm | 90% | 80% | 73% | 69% | 78% |
| −1.5 mm | 27% | 24% | 32% | 39% | 31% |

Example 2

A lens in accordance with FIG. 2 is provided. Referring to FIG. 2, optic zone 21 has an outer distance vision zone 22 with a diameter of 8 mm and an inner distance vision zone 24 with a diameter 2.10 mm. An inner near vision zone 23 is of a diameter of 1.04 mm and an outer near vision zone 25 is of a diameter of 4.74 mm. Dotted lines 26, 27, 28 and 29 represent pupils of diameters of 3.0, 3.5, 5.0 and 6.0 mm, respectively.

The pupil sizes are analyzed for the percentage of distance power within the pupil area at y=0 and y=−1.5 for the distance reference point of y=0.8 mm. The results in Table 2 demonstrate that the lens design produces a pupil independent distance to near ratio for y=0 and y=1.5.

TABLE 2

| Example 2 | 3.0 mm | 3.5 mm | 5.0 mm | 6.0 mm | Average |
|---|---|---|---|---|---|
| 0.0 mm | 80% | 75% | 71% | 67% | 73% |
| −1.5 mm | 25% | 25% | 29% | 38% | 30% |

Comparative Example 1

Figure 3:
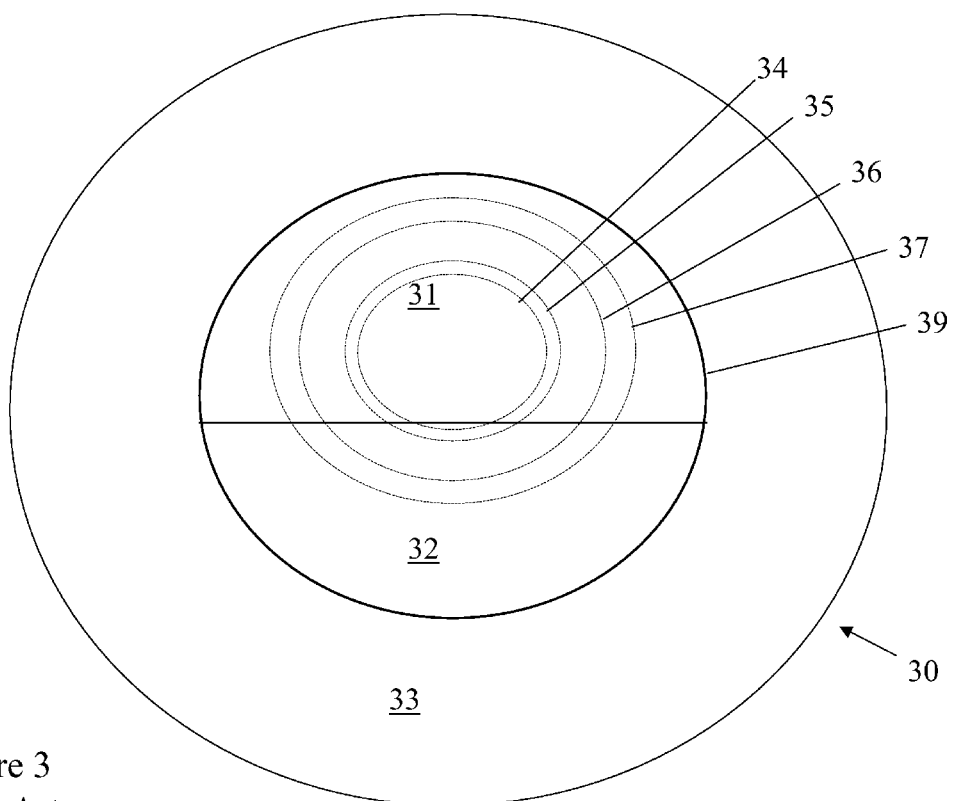
FIG. 3 depicts a first prior art lens.

A prior art translating bifocal contact lens of the design shown in FIG. 3. Referring to FIG. 3, lens 30 has a surface on which there is a lenticular zone 37 and an optic zone 39. Optic zone 39 has a diameter of 8 mm and contains a distance vision zone 31 in its superior portion and near vision zone 32 in its inferior portion. The boundary between the distance and near vision zones is located at y=−0.44 mm. The horizontal meridian is line 300. The distance reference point is at y=0.8 mm. Pupil sizes of 3.0, 3.5, 5.0 and 6.0, shown as dotted lines 33, 34, 35 and 36, respectively, are analyzed as set forth in Example 1 to determine the percentage of distance power at y=0 and y=−1.5 mm from the distance reference point. Table 3 shows the lens design produces pupil dependent distance to near at y=0 based on the wide variation in results between the 3 mm and 6 mm pupils.

TABLE 3

| Example 2 | 3.0 mm | 3.5 mm | 5.0 mm | 6.0 mm | Average |
|---|---|---|---|---|---|
| 0.0 mm | 100% | 94% | 85% | 76% | 89% |
| −1.5 mm | 34% | 37% | 42% | 41% | 39% |

Comparative Example 2

Figure 4:
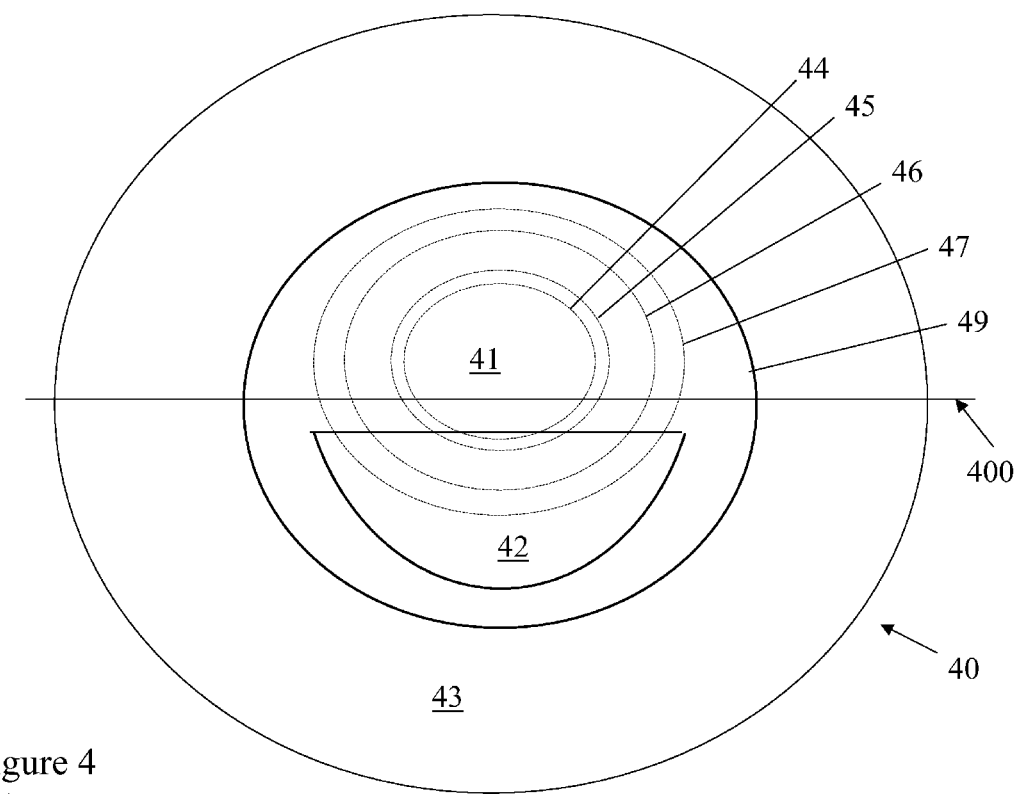
FIG. 4 depicts a second prior art lens.

A second prior art translating bifocal contact lens of the design shown in FIG. 4. Referring to FIG. 4, lens 40 has a surface on which there is a lenticular zone 43 and an optic zone 49. Optic zone 49 has a diameter of 8 mm and contains a distance vision zone 41 and a near vision zone 42. The near segment is located at 0.6 mm below the horizontal meridian 400. The distance reference point is at y=0.8 mm. Pupil sizes of 3.0, 3.5, 5.0 and 6.0, shown as dotted lines 44, 45, 46 and 47, respectively, are analyzed as set forth in Example 1 to determine the ratio of distance power within the pupil area at y=0 and y=−1.5 mm from the distance reference point. Table 4 shows although the lens design produces pupil independent distance percentage, a translation distance of greater than 1.5 mm is required to reduce the ratio to significantly below 50% at large pupil sizes, meaning sizes of >6 mm.

TABLE 4

| Example 2 | 3.0 mm | 3.5 mm | 5.0 mm | 6.0 mm | Average |
|---|---|---|---|---|---|
| 0.0 mm | 100% | 94% | 85% | 76% | 89% |
| −1.5 mm | 34% | 37% | 42% | 50% | 41% |

Comparative Example 3

Figure 5:
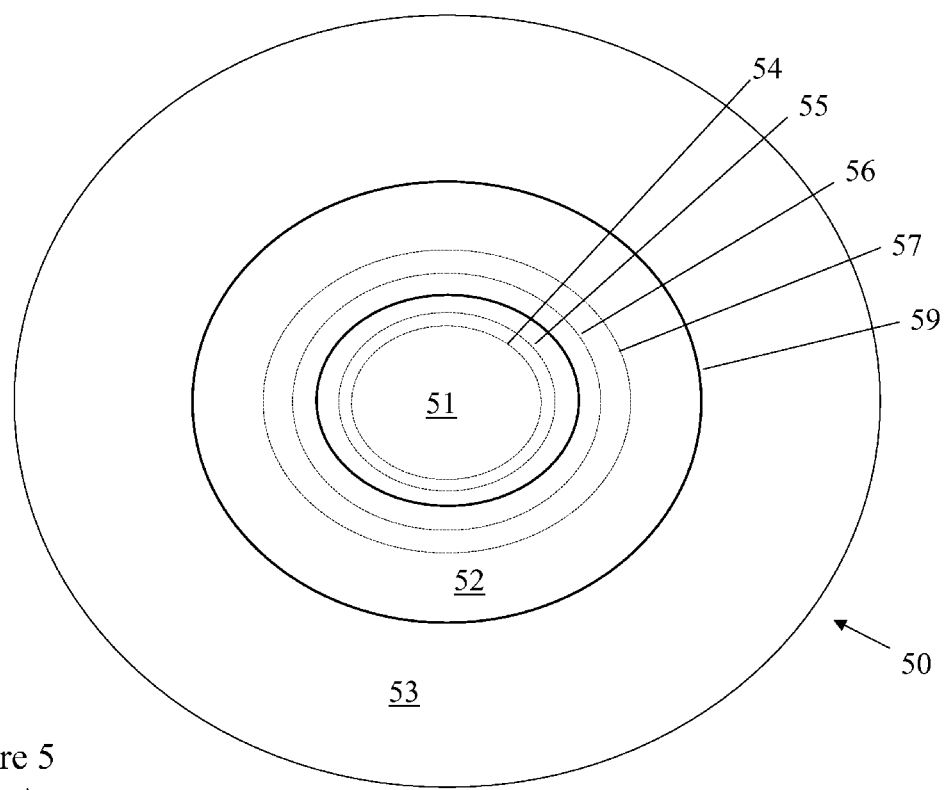
FIG. 5 depicts a third prior art lens.

A third prior art translating bifocal contact lens of the design shown in FIG. 5. Referring to FIG. 5, lens 50 has a surface on which there is a lenticular zone 53 and an optic zone 59. Optic zone 59 has a diameter of 8 mm and contains a centrally located distance vision zone 51 having a diameter of 4.20 mm with a annular near vision zone 52 surrounding the distance vision zone. The distance reference point is at y=0.0 mm. Pupil sizes of 3.0, 3.5, 5.0 and 6.0, shown as dotted lines 54, 55, 56 and 57, respectively, are analyzed as set forth in Example 1 to determine the percentage of distance power in the pupil area at y=0 and y=−1.5 mm from the distance reference point. Table 5 shows that although the lens design is pupil independent at y=−1.5 mm, with percentages between 39 and 54%, it is pupil dependent at y=0 mm with percentages between 50 and 99%. Also, with pupil sizes of <3.0 mm, a greater than 1.5 mm translation distance is required to reduce the distance percentage <50%.

TABLE 5

| 0.0 mm | 99% | 99% | 73% | 50% | 80% | 24% |
| −1.5 mm | 54% | 52% | 45% | 39% | 48% | 7% |

Comparative Example 4

Figure 6:
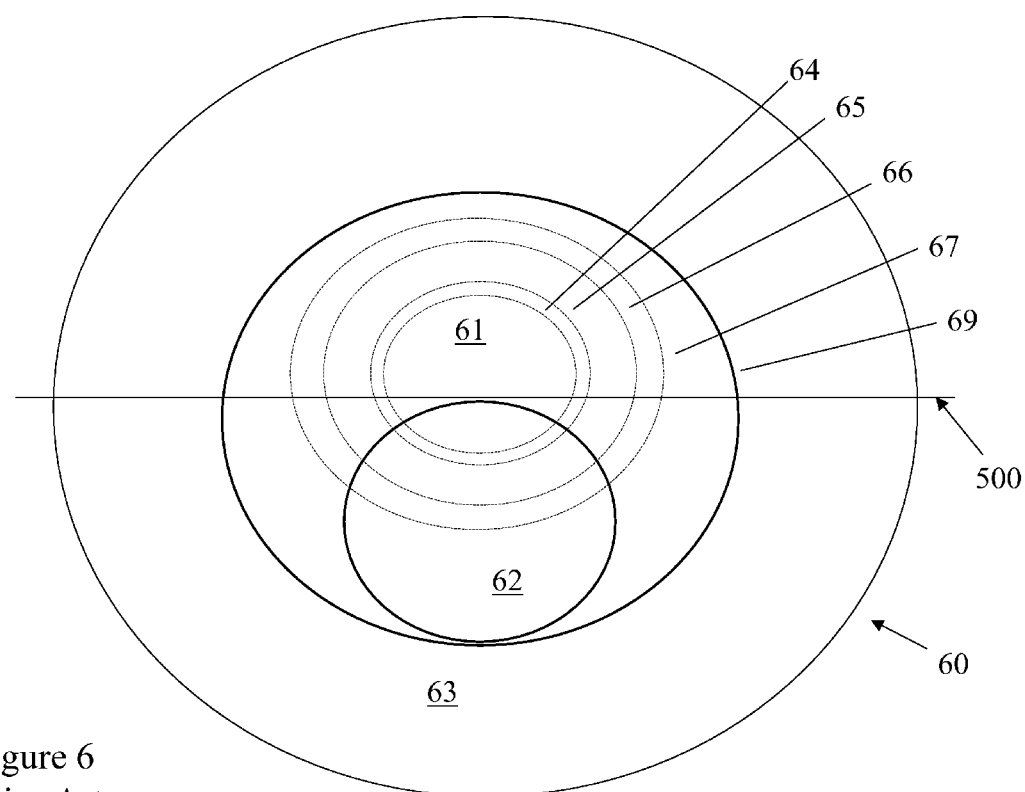
FIG. 6 depicts a fourth prior art lens.

A fourth prior art translating bifocal contact lens of the design shown in FIG. 6. Referring to FIG. 6, lens 60 has a surface on which there is a lenticular zone 63 and an optic zone 69. Optic zone 69 has a diameter of 8 mm and contains a distance vision zone 61 with a near vision zone 62 having a diameter of 4.20 mm. The superior-most boundary of near vision zone 62 is located approximately 0.3 mm above the geometric center of optic zone 69. The distance reference point is at y=1.0 mm. Pupil sizes of 3.0, 3.5, 5.0 and 6.0, shown as dotted lines 64, 65, 66 and 67, respectively, are analyzed as set forth in Example 1 to determine the percentage of distance power in the pupil area at y=0 and y=−1.5 mm. Table 6 shows that although the lens design is pupil independent at y=0 mm, with percentages between 71% and 78%, it is very pupil dependent at y=−1.5 mm, with percentages of between 5% and 45%.

TABLE 6

| Example 2 | 3.0 mm | 3.5 mm | 5.0 mm | 6.0 mm | Average |
|---|---|---|---|---|---|
| 0.0 mm | 78% | 74% | 74% | 71% | 74% |
| −1.5 mm | 5% | 15% | 37% | 45% | 25% |

What is claimed is:

1. A translating contact lens, comprising an optic zone having at least two distance vision zones comprising distance vision power, at least one near vision zone comprising near optical power and a horizontal meridian, wherein the amount of area of the optic zone associated with distance vision power at or above the horizontal meridian is greater than 50% of the total area of the optic zone at or above the horizontal meridian and the amount below the horizontal meridian is less than 50% of the total area of the optic zone at or below the horizontal meridian.

2. The lens of claim 1, wherein the optic zone is on a convex surface of the lens.

3. A translating contact lens, comprising a horizontal meridian, vertical meridian and an optic zone, the optic zone comprising a first and a second distance vision zone each centered at a geometric center of the optic zone and a near vision zone having a center located at about y=−1.63 mm along the vertical meridian, wherein one of the first distance vision zone lies within the near vision zone such that a superior-most border of the near vision zone is tangential to a superior border of the first distance vision zone and the near vision zone lies within the second distance vision zone and an inferior-most border of the near vision zone is tangential to the inferior-most border of the second distance vision zone.

4. A translating contact lens, comprising a horizontal meridian, a vertical meridian and an optic zone, the optic zone comprising a first and second distance vision zone each centered at a geometric center of the optic zone and a first and second near vision zone, the first near vision zone centered at y=−1.63 mm along the vertical meridian and the second near vision zone centered at y=−0.74 along the vertical meridian, wherein the first and second near vision zones and the second distance vision zone lie within the first distance vision zone, the second distance vision zone and the second near vision zone lie within the first near vision zone and the second distance vision zone lies within second near vision zone, a superior-most border of the second distance vision zone being tangential to the superior-most border of first near vision zone, an inferior-most border of second near vision zone being tangential with an inferior-most border of the second distance vision zone, and an inferior-mot border of the first near vision zone being tangential to the inferior-most border of the first distance zone.

5. A translating contact lens, comprising an optic zone having at least two near vision zones comprising near vision power, at least one distance vision zone comprising distance optical power and a horizontal meridian, wherein the amount of area of the optic zone associated with distance vision power at or above the horizontal meridian is greater than 50% of the total area of the optic zone at or above the horizontal meridian and the amount below the horizontal meridian is less than 50% of the total area of the optic zone at or below the horizontal meridian.

6. The lens of claim 5, wherein the optic zone is on a convex surface of the lens.

7. A translating contact lens, comprising a horizontal meridian, vertical meridian and an optic zone, the optic zone comprising a first and a second near vision zone each centered at a geometric center of the optic zone and a distance vision zone having a center located at about y=+3.2 mm along the vertical meridian, wherein the distance vision zones lies within the first vision zone such that a superior-most border of the distance vision zone is tangential to a superior border of the first near vision zone and an inferior-most border of the second near vision zone is tangential to the inferior-most border of the distance vision zone.

8. A method for correcting presbyopia, comprising the step of providing a translating contact lens comprising a horizontal meridian and an optic zone having at least two distance vision zones comprising distance vision power and at least one near vision zone comprising near optical power, wherein an amount of distance vision power at or above the horizontal meridian is greater than 50% of the total corrective power of the optic zone and the amount below the horizontal meridian is less than 50% of the total corrective power of the optic zone.

9. A method for correcting presbyopia, comprising the step of providing a translating contact lens comprising a horizontal meridian and an optic zone having at least two near vision zones comprising near vision power and at least one distance vision zone comprising distance optical power, wherein an amount of distance vision power at or above the horizontal meridian is greater than 50% of the total corrective power of the optic zone and the amount below the horizontal meridian is less than 50% of the total corrective power of the optic zone.

* * * * *